United States Patent [19]
Gerek et al.

[11] 3,947,617
[45] Mar. 30, 1976

[54] COATED CONTAINER

[75] Inventors: Gene Gerek; Robert G. Coucher, both of Salt Lake City, Utah

[73] Assignee: EPPCO, Salt Lake City, Utah

[22] Filed: July 8, 1974

[21] Appl. No.: 486,464

[52] U.S. Cl. .................. 428/35; 427/34; 428/418
[51] Int. Cl.² ..................................... B65D 25/14
[58] Field of Search ........... 117/18, 21, 93.1 PF, 96, 117/97, 132 B, 132 BE, 132 C, 161 UF, 161 P, 161 UZ; 113/120 A; 428/35, 36, 413, 418; 427/34

[56] References Cited
UNITED STATES PATENTS

| | | | |
|---|---|---|---|
| 3,179,784 | 4/1965 | Johnson | 117/93.1 PF |
| 3,183,337 | 5/1965 | Winzeler et al. | 117/93.1 PF |
| 3,286,836 | 11/1966 | Cesari | 117/97 |
| 3,378,391 | 4/1968 | Winzeler et al. | 117/93.1 PF |
| 3,387,475 | 6/1968 | Seipp et al. | 113/120 A |
| 3,415,673 | 12/1968 | Clock | 117/21 |
| 3,784,396 | 1/1974 | Fourment et al. | 117/21 |

*Primary Examiner*—John H. Newsome
*Attorney, Agent, or Firm*—Trask & Britt

[57] ABSTRACT

A small-mouthed container having a continuous resinous coating covering the interior of said container and end, said interior coating having a thickness less than about 1 mil and being free of low molecular weight organic matter, is disclosed herein. Typical containers are food and beverage containers having cylindrical metal walls and circular disc-shaped ends. The coating is typically a comestible coating having a thickness of less than 1 mil and having no occluded solvent therein. Thermoset resinous coatings are particularly useful.

A coating is applied by flowing a mixture of gas and fine resin particles through a nozzle into the vicinity of a plasma arc flame which at least partially melts the surface of said particles and propels said particles into a rapidly spinning container having one closed end. A predetermined quantity of resin is pulsed through the nozzle to deposit on the interior of the container a uniform coating of resin particles. A cured coating can be obtained by introducing the particles into a plasma flame for a sufficient residence time to liquify substantially said particles and to impart sufficient energy therein that said particles cure upon said substrate without subsequent addition of energy. Alternatively, the container coated with uncured particles can be heated in a curing oven for a period and at a temperature sufficient to produce a cured resinous coating.

15 Claims, 6 Drawing Figures

COATED CONTAINER

BACKGROUND OF THE INVENTION

Small-mouthed containers, primarily of metal although some heavy duty paper containers are prevalent, are utilized for many purposes, most predominantly for food and beverage — the ubiquitous "tin can". Although it is not a widely known fact, almost all "tin cans" used for food and beverage purposes are coated on the interior with a thin, usually about 1 mil or less, comestible (food grade) resinous coating. About 60 million pounds of resin are utilized each year in coatings for food and beverage containers. These organic resinous coatings, which may vary in composition dependent upon the ingredient which it will contact, are necessary to prevent contamination of the food or beverage by the metal container, whether said container is tin plated steel or aluminum. Contamination of food and beverage by the metal container generally affects flavor, occasionally makes the food or beverage unwholesome, and frequently affects appearance. Also, the coating promotes the shelf life of the "canned" ingredients.

A number of different resinous compositions have been utilized with success as coatings for metallic containers, particularly food and beverage containers. Although water-based coatings have been available for a number of years, the films or coating resulting therefrom have not been satisfactory for food and beverage containers; for example, beer becomes turbid when stored for even short durations in metal containers coated with a water-based resinous coating.

The mainstay of the can coating industry has been organic, solvent-based coatings — in spite of the fact that the solvent, which evaporates upon application of the coating, is 80% of the weight of the material and often has a greater cost than the resin which remains on the container. Organic, solvent-based coatings have been successful, however, because this coatings can be applied to metal containers which do not affect substantially the taste of the food or beverage. Solvent-based coatings, however, have a very distinct disadvantage — a very large quantity of solvent evaporates into the atmosphere adjacent container coatings facilities. These organic solvents are generally noxious and frequently toxic.

One approach towards eliminating solvents from container coatings is to use 100% solids coating systems; e.g., the liquid styrene-polyester systems, epoxy resins and the like. Liquid systems containing 100% coatings solids; i.e., everything in the liquid system reacts or interacts to become an integral part of the resinous (polymeric) coating formed upon a substrate, have severe limitations in that few polymeric systems lend themselves to a liquid system wherein one of the reactants is dissolved in another reactant. Also, those 100% solids liquid systems available have such high viscosities that application by spray techniques is impracticable, if not impossible, especially when thin films are desired. A further limitation of 100% solids coatings for containers is the inclusion in the coating of a certain quantity of monomer or low molecular weight polymer which, even present as parts per million, produces odor and usually contributes taste to the coating.

Another type of 100% solids coating material is a powdered, resinous material. Powder coatings, as the term is commonly used, have been applied to objects primarily by fluid bed and electrostatic spray techniques. Fluid bed techniques are unsatisfactory to coat food and beverage containers since such technique coats both the interior and exterior, thereby consuming an uneconomical amount of resin. Also, coatings formed in a fluid bed tend to be relatively thick; e.g., 5 mils and greater. Electrostatic spray techniques work very well for most objects, although coatings less than 1 mil thick are difficult to obtain.

However, electrostatic spray principles (a charge on the powder and an opposite charge on the object to be coated) do not work when the interior of a small cylindrical metal container is to be coated. An effect known as the Faraday Cage Effect occurs when powder containing an electrostatic charge is propelled towards the interior of an oppositely charged metal cylindrical container having one end thereon, resulting in formation of a partial coating.

DESCRIPTION OF THE INVENTION

A small-mouthed container having an end thereon and coated with a thin, continuous resinous coating covering the interior, said coating being free of low molecular weight organic matter, has now been invented. Small containers, especially slender, cylindrical metal containers, are coated internally with a variety of resinous coatings so that foods and beverages can be safely stored therein.

The coated containers of this invention possess improved properties in that coating-substrate adhesion is improved; the coatings have smooth surfaces; coating thickness is uniform; the coatings are free of low molecular weight organic materials, particularly organic liquids. The coatings may be thermoset or thermoplastic and are generally very thin; i.e., less than 1 mil.

The coated container may be formed by either of the two predominant methods, the first involving the rolling and seaming of a sheet of metal to form a cylinder followed by the bonding thereto of two ends. The second, and more recent, technique which is particularly adapted for aluminum containers involves drawing and ironing a sheet of metal into an elongated cylindrical container of substantially uniform wall thickness with one end being an integral part thereof. The coating of either type container with a thin, substantially uniform coating on the interior thereof according to the instant invention involves substantially the same technique as described more fully hereinafter.

DESCRIPTION OF THE DRAWINGS

The figures attached hereto illustrate embodiments of this invention as follows.

CONTAINER DESCRIPTION

Although containers of various size, shape and construction are within the scope of this invention, the invention particularly relates to containers which have a relatively small opening; i.e., from about 1½ inches to about 4 inches, a cylindrical wall and a closed end opposite an open end. These containers frequently have a depth (length) substantially greater than width of the container opening. Containers of this type have broad commercial use as food and beverage containers such as containers for dog foods, seafoods, soups, soft drinks, beer, and juices. Typical containers for foods and beverages have a capacity of less than about 1 quart; i.e., 32 fluid ounces.

Figure 1:
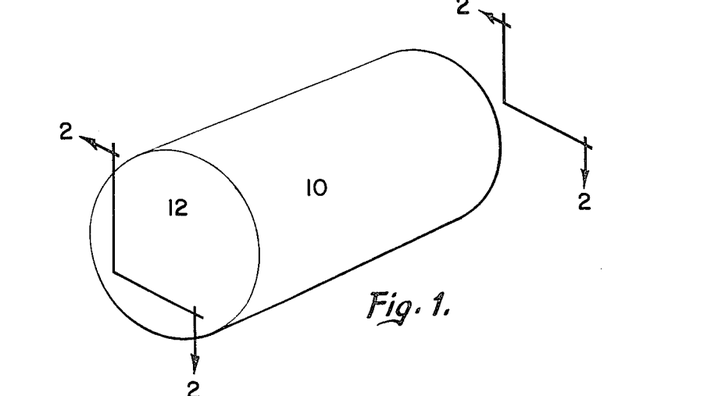
FIG. 1 is a perspective view of a cylindrical container.
Figure 2:
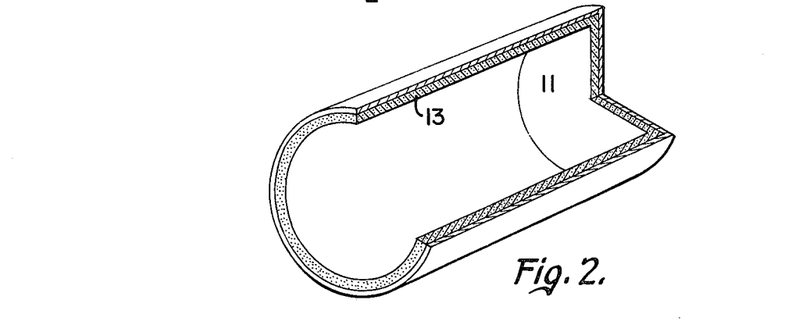
FIG. 2 is a cross-sectional view of the container of FIG. 1 along section lines 2—2.

In FIG. 1, a typical cylindrical container with closed end thereon is illustrated. In FIG. 2, a cross-sectional view of FIG. 1 along section lines 2—2, a thin resinous coating is shown adhered to the cylindrical container wall. Typically the container wall is relatively thin, being from about 3 to about 15 mils. This thickness is fairly common for metal containers, which are usually aluminum, tin-free steel or tin plated steel, although thicker-walled containers are also utilized, especially those constructed of paper walls with an aluminum foil interior and a metallic end thereon.

A coated, cylindrical container 10 is illustrated in FIGS. 1 and 2. As illustrated, the longitudinal dimension of the container is substantially greater than its diameter. The container has a closed end 11 and an open end 12. The entire interior of the container is coated with a film 13 which has a substantially uniform thickness less than about 1 mil. The film is substantially pore-free and contains no occluded organic solvents.

The container illustrated in FIGS. 1 and 2 is known as a two-piece container, since one piece comprising the cylindrical sides and one end are formed from a single piece of metal by a drawing and ironing process. The second piece, i.e., the disc to close the open end of the container, is coated separately and subsequently joined by a double seam and bonded to the open end of the coated cylinder.

Although the following characteristics of the novel container of this invention are described primarily with reference to a thin-walled, cylindrical container, containers of various other shapes and sizes and wall construction; e.g., a composite wall of thin aluminum or steel foil and paper plys, are within the scope of this invention.

The coating adhering to the interior surfaces of the container can be either a thermoset or thermoplastic resinous coating which has a higher density and lower porosity than a film of similar chemical composition applied from a solvent system. The coating contains no free organic materials of low molecular weight, particularly liquid organic solvent materials, and has improved adhesion in comparison with films of similar chemical composition applied from a solvent system. Low molecular weight ingredients, such as solvents, monomers, dimers and the like, have a molecular weight generally of less than about 150. The film is generally less than about 1 mil in thickness and frequently less than 0.5 mils. The film is uniform in thickness and because no solvent evaporates from the film, the film is blister free. The film is substantially cured, in the case of thermoset resins, and substantially cooled, in the case of thermoplastic resins, shortly after application so that the coated part may be handled and subjected to further fabrication without damage to the film.

Particular thermoplastics, which are useful in providing thin, uniform coatings having the characteristics described above, include thermoplastic epoxide and phenoxide resins having molecular weights of about 20,000 to about 200,000, polypropylene, nylon, polyethylene and the like. Thermoplastic epoxide resins adhered to container substrates as a continuous, blister-free film are particularly uncommon. Because of the high molecular weight of commercial thermoplastic epoxide resins, it is possible only to get about 10% by weight of the material dissolved in a solvent, which results in high solvent retention, blistering, high porosity and generally poor adhesion. Acceptable films for containers for the reasons set forth herein and for other reasons have not been derived from a solvent based polypropylene or nylon system. Furthermore, the solvent of such systems has a great affinity for the polymer which results in the presence of about 3 to 5 percent by weight of solvent in dry films.

Containers having on their interior thin, adherent films of nylon, polybutylene, ethylene-maleic acid copolymers, or polypropylene which are solvent-free, blister-free and possess a thin, uniform thickness have not heretofore been made. Polypropylene has some limitation as an interior coating for food and beverage cans as it tends to absorb flavor; however, it can be used as a coating for beer containers since some absorption of some flavor can be tolerated. A critical characteristic of a beer container coating is that it must not add any flavor to the beer. Nylon is particularly inert and is especially satisfactory as a coating for food and beverage containers, albeit expensive. A thin nylon film, for example, thicknesses less than 0.5 mil and preferably less than about 0.3 mil, having a pore free, blister free characteristic, are competitive with thicker films of less expensive resins. It has not been possible previously to form nylon films on the interior of containers from a powdered nylon resin in film thicknesses of 0.5 mils and less.

Thermoset resinous coatings adhered to interior container surfaces include thermoset epoxy resins, phenoxy resins, epoxy phenolic resins, epoxy-urea resins, acrylic resins and the like.

Epoxy resins are particularly useful coatings for food and beverage containers.

COATING PROCESS

The techniques of applying resins, especially thermoset resins, to substrates by plasma spray techniques, is set forth in detail in copending U.S. patent application Ser. No. 430,094 of common inventorship.

Although many of the techniques involved in coating a flat surface are applicable to coating a container, the coating of a small-mouthed, cylindrical container presents unique problems and requires special processing techniques to apply thin, continuous coatings over the whole container interior. Particular techniques for coating containers involves proper energy input to the spray gun, controlled resin feed to the gun, and, in particular, controlled, intermittent resin feed, external resin introduction point and container rotation.

Figure 3:
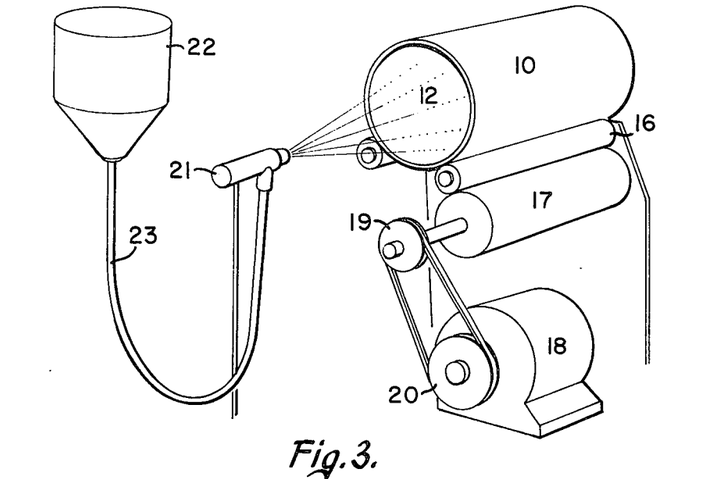
FIG. 3 is a perspective view of a container spray apparatus.
Figure 4:
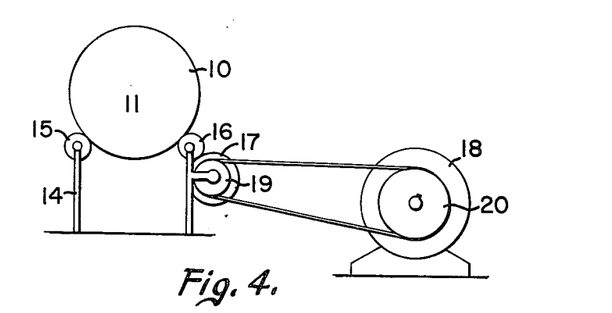
FIG. 4 is an elevational view of the apparatus of FIG. 3.

FIGS. 3 and 4 illustrate a process for applying a coating to a container interior utilizing a plasma spray device. A cylindrical container 10 having a closed end 11 and an open end 12 is nestled on a cradle 14 which rotate the container about its longitudinal axis at speeds of about 500 rpm to about 5,000 rpm and preferably from about 700 rmp to about 2500 rpm. The cradle 14 comprises a pair of support rollers 15 and 16, of which one support roller 16 is driven by an intermediate roller 17 to impart rotation to the container. The intermediate roller 17 is driven by motor 18 by a belt connecting roller pulley 19 with motor pulley 20. A typical electric motor rotates at 1750 1,750 rpm. The rotational velocity of container 10 is determined by the diameter of the container and the diameters of the intermediate roller 17 and the ratio of the diameters of the respective pulleys.

Figure 5:
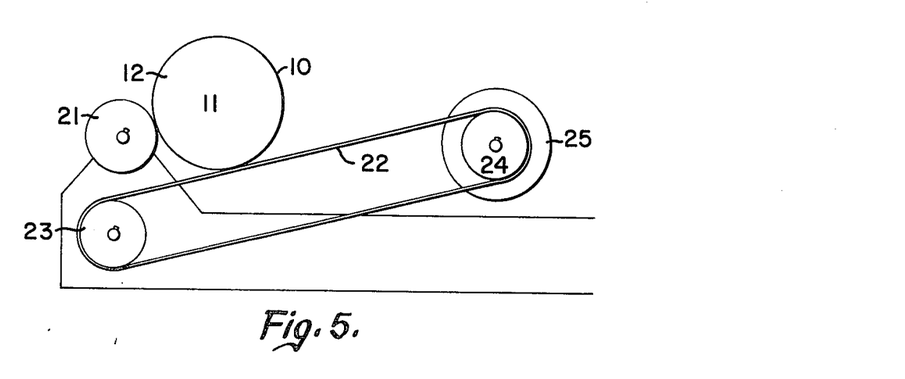
FIG. 5 is an elevational view of a container rotating mechanism.

In FIG. 5 an alternative rotator for a cylindrical container 10 having a closed end 11 and an opun end 12 is nestled against an idler roller 21 and is driven by a belt 22 passing around an idler pulley 23 and a drive pulley 24 which is driven by motor 25. The ratio of diameters of the drive pulley 24 to container determines the rotational velocity of the container, i.e., a one-to-one ratio results in the container revolving at the same rate as the motor driving pulley 24. If the ratio of diameters of container to pulley is 2:1, the container will revolve half as fast as motor 25.

A plasma spray device producing a plasma spray and supplied with a predetermined, accurately controlled flow of finely divided resinous particles is located externally to the container within a few inches of opening 12. The spray device is offset from the longitudinal axis of the container so that the longitudinal axis of the barrel of the spray device encloses an angle of about 5° to about 30° with the longitudinal axis of the cylinder.

Finely divided resinous particles, either thermosettable or thermoplastic particles having a thickness generally less than 100 microns, are fed from a precisely controllable, variable feed rate powder feeder at a rate of from less than about 1 gram per minute to about 150 grams per minute, with a typical rate for plasma spraying of about 3 to 50 grams per minute. A uniform flow rate from the powder feeder is required in order to coat containers uniformly. Because thin coatings are being applied, a deviation in flow rate of as much as 30 percent can cause a particular container to receive an insufficient coating.

The control of powder-gas streams of small weight and volume is not easily accomplished. Many commercial powder feeders have no rate control and a deviation in flow of 50 to 100% or more is frequently experienced. In copending patent application Ser. No. 223,969 filed Feb. 7, 1972 by Robert Coucher, one of the applicants herein, an accurately controllable powder feeder is disclosed which can feed resins at rates of less than 1 gram per minute to 150 grams per minute and more, with a deviation of less than 10% at any selected flow rate.

A carrier gas, such as dry nitrogen, is introduced to the powder feeder 22 of FIG. 3. The carrier gas flow rate through the powder feeder and through delivery tube 25 is from about 1 CFH to about 50 CFH (cubic feet per hour). The carrier gas carries the resin through delivery tube 23 to spray gun 21. The carrier gas rate is generally related to the resin rate; i.e., lower carrier gas rates are associated with lower resin rates and higher carrier gas rates with higher resin rates. Higher carrier gas rates, however, may occasionally be utilized with lower resin rates to assist in controlling the temperature to which the resinous particles are heated by the plasma spray device.

The plasma spray device, i.e., the spray gun comprises a plasma chamber and nozzle for generation of a plasma flame. A gun having a power level of about 3 to about 10 kilowatts with an average of about 7 kilowatts is particularly advantageous for use in the instant invention. Typical coatings applications for cylindrical containers are conducted at a voltage of about 30 to 55 volts at 80 to about 150 amps, providing a typical operating power of about 2500 to about 5000 watts. As indicated herein, argon is a preferred ionizing gas to obtain the lower flame temperatures preferred for spraying resin powders, particularly thermoset resin powders. Nitrogen may be present in the ionizing gas mixture up to about 20% of the mixture with argon being the remaining gas.

The rotational speed of the container is an important factor in coating cylindrical containers with a thin, resinous coating. Proper rotational speeds for achieving a thin coating apparently create a vortex within the container which distributes the resin particles within the container. Rotational speeds below about 500 rpm do not create the proper conditions for spraying resinous particles with a plasma spray device inasmuch as the resulting coating, if one is formed, is not uniform. Also, backfiring or exploding of the fine resin particles within the container tends to occur when resin particles are sprayed with a plasma spray device into a stationary or slowly rotating two-piece container, i.e., a container which has one end in place. A cylinder having two open ends is not coated when processed according to the techniques of this invention. A vortex is apparently not formed when the cylinder is rotated, and an openk stationary cylinder can be sprayed with a powder from a plasma flame without backfiring occurring. In neither instance, however, is a continuous coating deposited. An open cylinder may be coated in a manner similar to that employed with a two-piece container; i.e., placing an end on the cylinder or providing an apparent closure on one end by having the open end of the cylinder away from the spray adjacent a flat surface so that the cylinder has, in effect, a bottom.

Finely divided resin particles, like fine solid particles of dust, tend to be explosive whenever the particles are mixed in air and in the presence of an arc or flame. It is surprising that the explosive condition which exists when spraying a stationary container with a plasma spray device can be overcome by rotating the container at certain rotational speeds.

As indicated herein, rotational speeds of about 500 to 5,000 rpm and preferably from about 700 to 2,500 rpm are preferred for coating small diameter containers; i.e., those containers with a diameter less than about 4 inches. These containers are usually longer than they are wide and have one closed end or a flat surface so close to the end that the effect is the same. The process is particularly useful in coating two-piece containers inasmuch as it has been found that a cylindrical container having two open ends is not properly coated when treated by the process of the instant invention unless a flat surface is placed closely adjacent the distant open end.

The spray gun 21 illustrated in FIG. 3 is generally placed from about ¼ inch to 5 inches from the mouth of container 10 and preferably from about ½ inch to 3 inches. It is preferred to spray with the spray nozzle close to the container mouth so that overspray is minimized and the particle energy, both thermal and kinetic, dissipates very little before contacting the substrate.

The interior or a two-piece container rotated as set forth herein is a more efficient substrate to coat than a flat substrate. For flat substrates, the preferred distance from gun to substrate is about 3 to 5 inches to achieve a continuous, cured coating with addition of energy subsequent to the spraying process. In contrast, cured, continuous coatings can be applied to a substrate with the gun located from ¼ inch to about 5 inches from the container mouth, although a distance less than 3 inches is preferred to reduce overspray.

The efficiency of coating containers, with a plasma spray process is further evidenced by a comparison of spray times for containers and flat surfaces. Utilizing argon as the ionizing gas, a container having an interior area of about 36 square inches can be coated with a thin, continuous, cured thermoset coating in about 4 to 6 seconds. Under the same spraying conditions, a dwell time of about 12 to 18 seconds is required to coat a flat substrate of the same area with a continuous, cured coating of the same thickness. Utilizing mixtures of nitrogen and argon as the ionizing gas, a container having 36 square inches of interior area can be coated with a thin, continuous cured coating in about 1 second while a flat substrate of the same area requires about 3 to 4 seconds to coat the entire area with a cured, continuous film. Although the dwell time may be substantially reduced through formulation of thermoset resins with ultraviolet sensitizers, faster acting catalysts, and/or faster acting accelerators, the spray time for a container will remain several orders of magnitude faster than the spray time for a flat substrate of comparable area.

The dwell time to achieve a cured thermoset coating can be substantially reduced by preheating the container to about 150°F to about 250°F. A reduction of about 50% in dwell time is achieved by preheating the substrate to about 200°F.

As indicated hereinabove, one of the distinct advantages of spraying resinous particles by means of a plasma arc flame device is the importation of sufficient energy, both thermal and kinetic, to cause thermoset particles to form fully cured films upon a thin substrate without addition of energy from another source. The amount of energy imparted to said resin particles, however, may be controlled so that the resin particles do not receive sufficient energy to initiate polymerization of thermoset particles upon contact of the particles with a substrate.

The exact heat transfer mechanism experienced by the resinous particles has not been thoroughly determined. At the lower energy levels it appears that the surface of a particle has a much higher temperature than the particle interior. It is likely that the surface of the particle is substantially liquid even at the lower energy levels of the plasma arc spray device. Thus, particles sprayed at a low energy level which form a thin, substantially uncured film upon a substrate are likely to experience surface temperatures to a certain particle depth which are substantially above the melting point of the resin.

Thin, continuous coatings on the interior of a cylindrical container were formed according to the techniques of the instant invention by introducing thermoset resinous particles into the area ahead of the tip of a plasma arc generated flame and directing the softened particles into the interior of a rapidly spinning cylindrical container with a closed end. The resulting coating is porous and uncured, but it is substantially evenly distributed over the interior surface of the container. A non-porous, thin, continuous, cured film results when the container having an uncured film adhered thereto is subjected to temperatures in excess of the polymerization temperature of the resin for a few minutes in contrast with the much longer period required to cure films applied by other techniques and cured in the same manner. Even though an uncured resinous coating is deposited by this technique, the resinous particles may be in a gelled state and require only a small amount of additional energy to effect a fully cured, continuous coating.

An uncured, adherent coating of a thermosettable resin may be formed on the interior of a container by reducing the power supplied to the plasma spray device or by reducing the time period (dwell time) the container is exposed to the resin spray; i.e., the time period during which the container is exposed to the plasma flame. For example, an uncured, adherent coating can be formed in about 33 seconds dwell time at 1500 watts or in about 1 second, or less, at 2800 watts. The resin flow rate is adjusted to deposit a comparable film thickness. The ionizing gas for the spray conditions just mentioned is argon.

An uncured, adherent coating may be deposited by means of a plasma spray generated from an ionizing gas mixture of nitrogen and argon through use of a very short dwell time; e.g., less than ¼ second. To achieve an uncured coating, a argon to nitrogen ratio of at least about 10:1 is preferred. Larger quantities of nitrogen may be utilized if an inert diluent gas, i.e., a cooling gas, is introduced into the plasma flame. For these purposes the preferred diluent gas is nitrogen.

Uniform coatings can be applied to a two-piece cylindrical container over a period as short as 0.1 second. An accurate, uniform resin feed is required to apply uniform coatings within such a short space of time. Fast rotation of the container, e.g., 1500 to 2500 rpm or more, is preferred when the spray time is 1 second or less. At 1,500 rpm the container rotates 25 revolutions each second or 2.5 revolutions per 1/10th second. A typical dwell time for coating a cylindrical two-piece container is 2/10ths of a second.

A significant feature of the instant invention for coating a continuous stream of two-piece containers is the pulsing of predetermined, premeasured quantum of resin particles to the plasma spray device. On a continuous coating line a steady stream of containers is delivered to a rotating apparatus, such as the one illustrated in FIG. 3. A container is delivered to a rotating mechanism, rotated and sprayed, then ejected, and another container replaces the coated container on the rotating mechanism. A pulse of resin is delivered to the plasma spray gun only during the period that the container is rotated, which may vary from 0.1 second to several seconds but is typically from about ¼ second to about 1 second. A non-spraying period exists during the ejection of the coated container and the delivery of the next container to the rotating mechanism. This non-spraying period may be about 0.1 second to about 0.5 second. No change is made in the plasma flame during the non-spraying period, but no resin is fed during this period to reduce the amount of resin particles lost as overspray.

The pulsing of resin feed to the plasma gun is synchronized with the rotating mechanism so that the container rotates about one-fourth to one-half a turn before the resin feed begins and continues rotating for about one-fourth to one-half turn after the resin feed ceases. If the container is stationary when resin particles are being sprayed, there is a likelihood of "backfiring", i.e., ignition of the resin particles, which destroys any coating on the interior of the container. The rotational velocity of the container should be sufficient to permit at least one and one-half, and preferably two, revolutions of the container during the period resin particles are being sprayed into the container.

The flow of resinous particles during the duration of the spray period should be uniform so that the entire interior of the container will receive a uniformly distributed coating. Spinning the container at rotational speeds sufficient to create a vortex, e.g., 500 rpm and greater, assists in distributing the particles.

A typical two-piece container possesses about 36 square inches of interior area. A 1 mil coating thereon (about 20 mgs. per square inch) requires a total film weight of about 720 mgs. Thus, a container coating of 0.5 mil requires about 360 mgs. of resin to be delivered to the spray gun at a uniform rate over a period of, typically, about one-fourth second to about one second. A typical resin feed rate for coating containers is from about 90 grams per minute or more to about 15 grams per minute or less, depending upon the desired film weight and the number of containers coated per unit time.

EXAMPLE I

A cylindrical container about 5¼ inches in length and 2½ inches in diameter, having an open end and a closed end, was placed with the open end about 3 inches from the nozzle of a plasma spray gun. A powdered epoxy resin having a particle size of about 100 microns was introduced into the flame of a plasma spray device supplied with an argon/nitrogen mixture having a volume ratio of 10 to 1 at a rate of about 10 CFH and ionized by about 40 volts at 70 amps.

The container in a stationary position was subjected to a flow of liquefied resinous particles from plasma flame for a period of about 3 seconds. The flame directed into the open end of the container resulted in a flash back. No coating resulted on the interior of the container.

EXAMPLE II

A stationary container, as in Example I, was subjected to a plasma spray of finely divided liquefied particles directed into the open end of the container at an angle of about 30° from the longitudinal axis of the container. The plasma flame flashed back and no coating resulted on the interior of the container.

EXAMPLE III

The experiment of Example II was repeated while revolving the container at about 50 rpm. The flame flashed back and no coating resulted on the interior of the container.

EXAMPLE IV

The experiment of Example II was repeated while revolving the container at about 1,500 rpm. The container was rotated about 3 revolutions. A thin, continuous, cured film was formed over the whole of the container interior.

EXAMPLE V

Another experiment utilizing a plasma flame substantially identical to that used in Example I was directed into the open end of a cylindrical container rotated at about 1,500 rpm. The resin spray was directed along the longitudinal axis of the container. The container was rotated about 3 revolutions. A thin, continuous, cured film was formed over the whole of the container interior.

The container from Example V was examined. The film was substantially mar resistant and strongly adherent to the container. A second coating was applied to the exterior of the container without subjecting the container to any heating operation.

EXAMPLE VI

A number of two-piece containers (aluminum 12 oz. beer cans) having an opening 2½ inches in diameter and a length of 5¼ inches were coated with an epoxy resin having the same characteristics as Epon 1004 catalyzed with dicyandiamide substituted dicyandiamide.

The resinous particles were applied under various conditions by means of a plasma spray device having a barrel or nozzle diameter of 0.228 inches and having an external resin feed system which introduces the resin into the flame zone about 1 inch in front of the nozzle. The resin feed was accurately metered to the spray device by means of a powdered feeder of the type described in copending application Ser. No. 223,969. The containers were spun at a rotational velocity of about 1,500 rpm during the coating process. The following table indicates the coating conditions and results.

TABLE I

| Experiment Number | Gas Ionizing Rate in CFH $N_2$ | A | Distance from Gun to Container | *Dwell Time in Seconds | Powder Feed Rate in Gms. per minute | Power to Plasma Device Amps | Volts | Resin Carrier Gas Rate in CFH |
|---|---|---|---|---|---|---|---|---|
| 1 | 0 | 17 | 5 inches | 6 | 3 – 10 | 80 | 35 | 2 – 20 |
| 2 | 0 | 17 | 5 inches | 3 | 6 – 20 | 80 | 35 | 7 |
| 3 | 0 | 17 | 5 inches | 1 | 12 – 40 | 80 | 35 | 7 |
| 4 | 0.5 | 17 | 5 inches | 1 | 12 – 40 | 75 | 45–50 | 10 |
| 5 | 0 | 17 | 5 inches | 3 | 6 – 20 | 50 | 30 | 10 |
| 6 | 0 | 40 | 5 inches | 0.5 | 36 – 120 | 50 | 30 | 5 – 20 |
| 7 | 3.5 | 20 | 5 inches | 3 | 6 – 20 | 75 | 40 | 5 – 20 |
| 8** | 0.5 | 17 | 5 inches | 3 | 6 – 20 | 120 | | |

*Dwell time is the time the container was exposed to the plasma sprayed resin stream.
**Experiment No. 8 involved a thermoplastic cellulose acetate butyrate resin having a particle size of 30 to 75 microns; a melt viscosity of about 100,000 centipoise and a softening point of 350°F.

REMARKS

Experiment Number 1

Resin particles liquefied; resin flowed on substrate; coating cured. Film thickness 0.2 to 0.5 mils.

Experiment Number 2

Resin particles semi-liquefied; resin flowed slightly on substrate; coating partially cured; cured fully upon further heating to 350°F.

Experiment Number 3

Resin particles melted sufficiently to adhere to container interior as a uniform deposit of uncured resin coating cured to a continuous film at 350° for 10 minutes.

Experiment Number 4

Resin particles liquefied; resin flowed on substrate; coating cured. Film thickness 0.2 to 0.5 mils.

Experiment Number 5

Resin particles melted sufficiently to adhere to container interior as a uniform deposit of uncured resin coating cured to a continuous film at 350° for 10 minutes.

Experiment Number 6

Resin particles melted only very slightly; particles adhered but remained more discreet than Experiment 3; cured upon further heating.

Experiment Number 7

Resin particles scorched.

EXAMPLE VII

A comparison of the relative adhesion of a coating applied by plasma spraying of a powdered resin and of a coating applied to conventional solvent techniques was conducted. The coatings were applied to both treated and untreated aluminum containers. The treated containers had been chromate treated with Amchem Alodine 303 to improve coating adhesion to the container.

The resinous material was a thermoset epoxy comparable to Epon 1004 which is available in both powder form and dissolved in an appropriate solvent. The powder coating is cured with dicyandiamide while the dissolved resin is cured with urea. The solvent-based resin was known to possess adhesion properties comparable or better than other available solvent-based resins. The powdered resin was applied according to the technique described in Example V. The solvent based coating was applied according to conventional spraying techniques for containers. The solvent-based coating was cured for 10 minutes at 400°F. The coating applied by the plasma spray technique was heated at 400°F for several minutes to insure that the film was fully cured.

All the films were in water for thirty minutes. Adhesion of film to substrate was determined by applying Scotch tape to the film, then pulling off the tape and checking the amount of film removed. The results are illustrated in Table II.

TABLE II

| Substrate | Adhesion Test Powder Coating | Solvent- Based Coating |
| --- | --- | --- |
| Untreated aluminum container | Good adhesion | Poor adhesion |
| Treated aluminum container | Excellent adhesion | Good adhesion |

The powder coating applied by the plasma spray technique exhibited better adhesion to both treated and untreated substrates, apparently due to the high impact velocity of the particles upon the substrate and improved wetting of the substrate during flow-out. The superior adhesion of the plasma sprayed coating to untreated substrate is significant inasmuch as the chromate treating of substrates is being discouraged by the FDA to eliminate the possible inclusion of heavy metal ions, e.g., $Cr^{+6}$, in foods.

EXAMPLE VIII

A steel can was coated with an epoxy coating in a manner similar to Example V. A continuous cured coating about 0.5 mils thick was obtained.

The integrity of the film was evaluated by testing in an Enamel-O-Rater made by Waco. The conductivity of coating was determined by filling the container with a sodium chloride solution. One electrode is attached to the container while another is inserted in the electrolyte, i.e., the sodium chloride solution.

The conductivity of the coating was determined to be between 1 and 5 milliamps. An acceptable standard in the container industry is 75 milliamps.

The techniques provided by the instant invention contribute numerous advantages to the container coating art. An especially adherent, solvent-free film can be applied to a container interior by a single application of resin. For example, steel containers are typically sprayed several times with solvent-based coatings to achieve a satisfactory film. Solvent-based coatings generally apply only about 0.2 mil of film per application. In order to achieve a consistently acceptable film conductivity, i.e., a conductivity less than 75 milliamps in an Enamel-O-Rater test, a film thickness of about 0.5 to about 0.8 mils is generally applied.

In many commercial operations, a thin film of epoxy, about 0.2 mil, is applied from a solvent-based coating. The coating is cured in an oven, e.g., by heating at 400°F for about 10 minutes, and a second coating applied, which is frequently of a different chemical composition, such as a polyvinyl chloride or polyvinyl acetate polymer. The different composition may permit the application over an undercured base coat if the solvent system used for the second film is not a good solvent for the base film. Polyvinyl chloride and acetate coatings are generally desirable since they are less expensive than epoxy films, have good properties as a comestible coating although they do not adhere well to steel. Since a double application of coatings is required, the expense of the film becomes significant.

Epoxy films greater than 0.2 mil thick can be applied by repeated sprayings if a solvent-based coating after the previous film is cured. More than one application of film is required to produce films which have conductivities consistently less than 75 milliamps.

A further advantage of the plasma applied coatings is that the adhesion is generally superior to that of solvent-based coatings. This is especially so for untreated aluminum substrates. Plasma sprayed epoxy coatings, for example, exhibit about the same degree of adhesion to untreated aluminum as epoxy coatings applied from a solvent system have for chromate treated substrates. This is significant inasmuch as heavy metal ions, such as $CR^{+6}$, are considered toxic and the chromate treatment of containers is being discouraged. The improved adhesion realized with plasma sprayed coatings is attributed to high impact velocity of the resinous particle with the substrate and the ability of the coating to wet the substrate, i.e., go into pores and extend over the whole substrate surface. Also, under the conditions of application, the viscosity of the resin is lower at the movement of impact with the substrate than at any time previous or subsequent, thus enabling the coating to flow into the pores of the substrate, which is contributed to by the energy of impact.

Coatings applied to containers by other techniques, e.g., by spraying a solvent-based resin, do not impact the substrate with sufficient velocity to cause the resin particle to flow. Also, with other powder coating techniques, the viscosity of the resin particle is relatively high at the moment of impact with the substrate.

The high impact velocity of resin particles in this invention is provided by the flame velocity of the plasma arc device. Flame velocity may be regulated by the volume of ionizing gas introduced to the ionizing chamber and the diameter of the exhaust hose. For the purposes of this invention, a minimum flame velocity of about 600 feet per second is desired. A preferred velocity is from about 800 feet per second up to about sonic velocities. Sonic and supersonic flame velocities produce good coatings, but the accompanying noise is objectionable.

The ionization temperature also affects flame velocity because the gas expands as the gas temperature increases. Thus, a given rate of nitrogen to a plasma arc device will produce a much higher gas velocity than the same rate of argon to the same device inasmuch as the ionizing temperature of nitrogen is about twice that of argon.

A significant advantage of the instant invention for coating containers is that about 75% to about 100% of the energy required to cure a thermoset coating is imparted to the film by the plasma spray device. The achievement of this result is at least partly due to the efficiency with which a plasma spray device has coated the cylindrical interior of a container.

Figure 6:
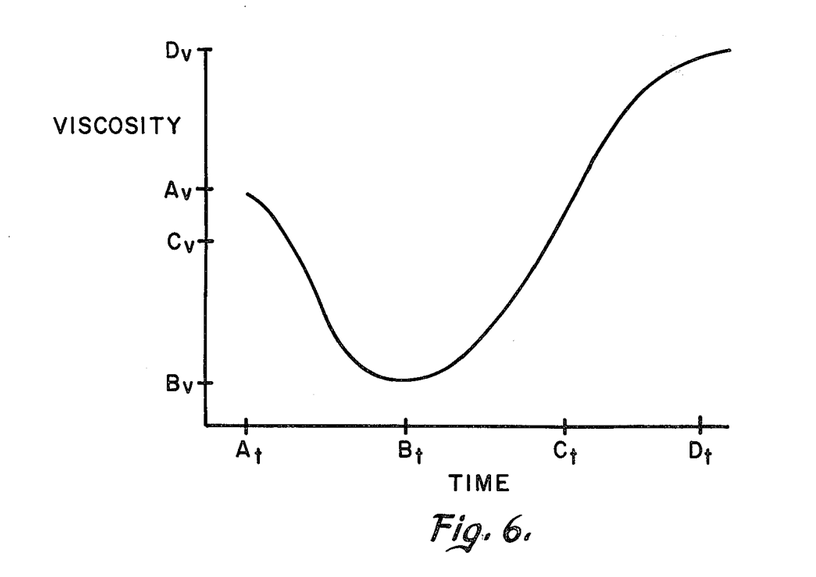
FIG. 6 is a resin viscosity chart.

The energy relationship to a coating is manifested by the viscosity-time relationship of a plasma sprayed, thermoset coating is illustrated in FIG. 6. A powdered resin has an initial viscosity $A_v$, which is relatively high, at time $A_t$. As energy is imparted to the resin, usually in the way of heat, the viscosity of the resin begins to drop, i.e., the resin becomes more fluid, until viscosity $B_v$ at time $B_t$ is achieved. At time $B_t$ sufficient energy has been imparted to the resin and the significant polymerization begins, which in the early stages is described as gellation of the resin. As energy is continued to be imparted to the film, the viscosity of the film rises rapidly as larger molecules are formed through polymerization. For many thermoset resins, only slight amounts of external energy need be supplied once $B_t$ is achieved inasmuch as the polymerization reaction is exothermic.

It has been found that containers can be rapidly coated with a thermoset resin to achieve a gellation stage of at least $C_v$. At $C_v$ the resin has received at least about 75% of the energy required to achieve a fully cured state $D_v$ at time $D_t$. The increase in viscosity after gellation begins is rapid. Although the plasma spray may be adjusted so that resin particles can be applied with a low level of energy imparted thereto, for example, at a viscosity between $A_v$ and $B_v$ in the chart of FIG. 6, it is significant that the technique has the capability of applying a resin particle to a container interior with a viscosity between $C_v$ and $D_v$, i.e., in a substantially fully cured state which requires the impartation of little, if any, additional energy to complete the curing of the film.

The film conductivity test employed in evaluating container coating integrity involves impressing a twelve volt constant voltage upon an electrolytic cell having as one electrode the container body with a stainless steel electrode immersed in an aqueous electrolyte, preferably a 10% sodium chloride solution. Although other salts such as potassium chloride, sodium carbonate and the like at concentrations of about 5 to 35 percent may be employed. The electrolyte occupies most of the container volume.

The purpose of the film conductivity test is to predict migration of iron or aluminum ions from the container into the contents of the container. It is estimated that a 12 ounce aluminum beer container having a film conductivity of 75 milliamps would experience a migration of about 150 to 200 parts per million of aluminum ions through the coating and into the beer during a storage period of about three months.

A higher film conductivity (lesser film integrity) can be tolerated for beer containers than for soft drink containers because of the greater acidity of soft drinks. For example, a film conductivity of 75 milliamps is generally regarded as acceptable for beer containers while a 10 milliamp conductivity is considered an upper limit for soft drink containers. The tolerable film conductivity or film integrity may vary if the storage time of the container with contents is known to be short; for example, a container whose contents are used within one month after filling may be acceptable even though it has a film conductivity three times as great as a filled container which has a storage life of three months.

Although the invention has been described by reference to specific embodiments, it is not intended to be limited solely thereto but to include all the modifications and variations falling within the scope of the appended claims.

What is claimed is:
1. A food container comprising:
   a. a thin-walled metal container having a closed end and an open end;
   b. a continuous comestible resinous epoxy coating cured with dicyandiamide or substituted dicyandiamide covering the interior of said container and end, said interior coating having a thickness of less than 1 mil and being free of low molecular weight organic matter.
2. The container of claim 1 wherein said resinous coating is a thermoset coating which is at least partially cured.
3. The container of claim 1 wherein said coating is blister free.
4. The container of claim 1 wherein said coating has a density greater than that of coatings of said resinous epoxy when applied from a liquid solvent system and cured.
5. The container of claim 1 wherein said coating has a porosity substantially less than that of coatings of said resinous epoxy when applied from a liquid solvent system and cured.
6. The container of claim 1 wherein said coating has greater adhesion to said container than that of coatings of the same resinous epoxy when applied from a liquid solvent system and cured.
7. The container of claim 1 wherein said coating has a thickness of less than ½ mil.
8. The container of claim 1 wherein said epoxy resin is cured with dicyandiamide catalyst and an accelerator.
9. The container of claim 8 wherein said accelerator is selected from the class comprising guanadine, pyri- dine, triazines, hydrozides, piperdine amidazoles.

10. The container of claim 1 wherein said epoxy resin is free of alcohol.

11. The container of claim 1 wherein said resinous epoxy is cured with dicyandiamide.

12. The container of claim 1 wherein said thin-walled metal container is a slender cylinder having a closed end and small open end.

13. The food container of claim 1 wherein said thin-walled metal container is a beverage container.

14. The food container of claim 13 wherein said thin-walled metal container is one-piece aluminum container.

15. The food container of claim 1 wherein said low molecular weight organic matter has a molecular weight less than 150.

* * * * *